(12) United States Patent
Sprague et al.

(10) Patent No.: US 7,443,548 B2
(45) Date of Patent: Oct. 28, 2008

(54) SYSTEMS AND METHODS FOR CREATING A SINGLE ELECTRONIC SCANNED JOB FROM MULTIPLE SCANNED DOCUMENTS

(75) Inventors: Mary Ann Sprague, Macedon, NY (US); M. Armon Rahgozar, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 741 days.

(21) Appl. No.: 10/248,612

(22) Filed: Jan. 31, 2003

(65) Prior Publication Data

US 2004/0150854 A1 Aug. 5, 2004

(51) Int. Cl.
*H04N 1/04* (2006.01)

(52) U.S. Cl. ............... 358/474; 358/405; 358/1.15; 358/540; 382/274

(58) Field of Classification Search ............ 358/1.15, 358/474, 500, 501, 3.01, 442, 402, 1.2, 405, 358/450, 468, 401; 382/284, 254, 274
See application file for complete search history.

(56) References Cited

U.S. PATENT DOCUMENTS

| | | | | |
|---|---|---|---|---|
| 5,126,858 A * | 6/1992 | Kurogane et al. | ........... | 358/450 |
| 5,243,381 A * | 9/1993 | Hube | ........... | 399/84 |
| 5,299,028 A * | 3/1994 | Kwarta | ........... | 358/445 |
| 5,339,176 A * | 8/1994 | Smilansky et al. | ........... | 358/504 |
| 5,463,295 A * | 10/1995 | Inde | ........... | 358/442 |
| 5,606,429 A * | 2/1997 | Sheldon et al. | ........... | 358/450 |
| 5,613,017 A * | 3/1997 | Rao et al. | ........... | 382/174 |
| 5,761,394 A * | 6/1998 | Sugiura et al. | ........... | 358/1.9 |
| 6,177,675 B1 * | 1/2001 | Gagnon et al. | ........... | 250/363.1 |
| 6,195,471 B1 * | 2/2001 | Larsen | ........... | 382/284 |
| 6,268,937 B1 * | 7/2001 | Kim | ........... | 358/488 |
| 6,289,371 B1 * | 9/2001 | Kumpf et al. | ........... | 709/203 |
| 6,404,516 B1 * | 6/2002 | Edgar | ........... | 358/487 |
| 6,542,260 B1 * | 4/2003 | Gann et al. | ........... | 358/471 |
| 6,552,827 B1 * | 4/2003 | Shimoosawa et al. | ........... | 358/468 |
| 6,587,861 B2 * | 7/2003 | Wakai et al. | ........... | 715/209 |
| 6,801,643 B2 * | 10/2004 | Pieper | ........... | 382/128 |
| 6,825,946 B2 * | 11/2004 | Motoyama | ........... | 358/1.15 |
| 6,977,754 B2 * | 12/2005 | Matsumoto et al. | ........... | 185/43 |
| 7,002,700 B1 * | 2/2006 | Motamed | ........... | 358/1.1 |
| 7,308,155 B2 * | 12/2007 | Terada | ........... | 382/284 |
| 7,366,360 B2 * | 4/2008 | Takiguchi et al. | ........... | 382/284 |
| 7,394,578 B2 * | 7/2008 | Itoh | ........... | 358/474 |
| 2002/0067520 A1 * | 6/2002 | Brown et al. | ........... | 358/906 |

* cited by examiner

*Primary Examiner*—Edward L. Coles
*Assistant Examiner*—Negussie Worku
(74) *Attorney, Agent, or Firm*—Oliff & Berridge, PLC

(57) ABSTRACT

This invention provides systems and methods that use a meta job description that combines a number of scan jobs into a single combined job and use a meta job description that incorporates the scan parameters for a plurality of scan. Scanning documents with a meta job description provides user with the ability to scan any number of different documents with different parameters and combine them into a single combined job before the job is sent to its final destination. This allows the user to compose a single electronic document from any number of documents with different parameters.

8 Claims, 8 Drawing Sheets

```
[service XRX_SVC_GENERAL]
{
        string JobTemplateLanguageVersion = "2.3.4";
}
end
[service XRX_SVC_SCAN]
{
        ref_invocation OutputDocument=XRX_DOCUMENT:my_doc;
}
end
[service XRX_DOCUMENT]
my_doc {

}
end
[service XRX_PRINT]
{
        ref_invocation InputDocument=XRX_DOCUMENT:my_doc;
}
```

*FIG. 7*

```
[service XRX_SVC_GENERAL]
{
        string JobTemplateLanguageVersion = "2.3.4";
}
end
[service XRX_SVC_SCAN]
{
        enum_imagemode DocumentImageMode=Photo;
        integer Darkness=2;
        ref_invocation OutputDocument=XRX_DOCUMENT:partial_doc1;
}
{
        enum_imagemode DocumentImageMode=Mixed;
        ref_invocation OutputDocument=XRX_DOCUMENT:partial_doc2;
}
[service XRX_DOCUMENT]
my_doc {
        ref_invocation CompoundDocument=XRX_DOCUMENT:partial_doc1,
XRX_DOCUMENT:partial_doc2;
}
partial_doc1 {
        enum_resolution Resolution=Res_300x300;
}
partial_doc2 {
        enum_resolution Resolution=Res_400x400;
}
[service XRX_PRINT]
{
        ref_invocation InputDocument=XRX_DOCUMENT:my_doc;
}
end
```

FIG. 8

SYSTEMS AND METHODS FOR CREATING A SINGLE ELECTRONIC SCANNED JOB FROM MULTIPLE SCANNED DOCUMENTS

BACKGROUND OF INVENTION

1. Field of Invention

The invention is directed to document capture and analysis.

2. Description of Related Art

Conventionally, when a page is scanned by a device, the resulting electronic image file is forwarded to its intended destination. The electronic image file can be stored, sent off as email, or stored as a desktop icon on a computer. However, a job can require that one or more additional pages need to be scanned as part of that single job. If any one of these pages has one or more different scanning parameters, such as, for example, a different image resolution, a different page size, and/or a different format, the set of two or more pages to be scanned with two or more different sets of parameters cannot be treated as a single job.

In general, these pages cannot be treated as a single job because there is nothing to tie together the two scanned jobs. Users wishing to have the images treated as a single job must either merge the scanned files manually, using third party software, or cannot merge the scanned files at all, making it difficult to have multiple scanned sections concatenated into a single job.

SUMMARY OF THE INVENTION

This invention provides systems and methods that use a meta job description that combines a number of scan jobs into a single combined job.

This invention separately provides systems and methods for creating a meta job description that incorporates the scan parameters for a plurality of scan jobs.

This invention separately provides systems and methods for scanning a set of documents using a set of parameters specific to that set of documents and appending that set of documents to a file containing scanned documents that have at least one different set of parameters.

This invention separately provides systems and methods for scanning a different sections of documents with different parameters and appending them into combined jobs.

This invention separately provides systems and methods for creating and changing a meta job description of the job performed.

This invention separately provides systems and methods for changing the meta job description as the job is performed.

This invention separately provides systems and methods for creating a single combined job that is larger than a capacity of the input device.

This invention separately provides systems and methods for directing a single combined job or components to a destination.

In various exemplary embodiments, an image is obtained, generated or stored. The image can be from an original physical document or one generated in the past. In various exemplary embodiments, the general data flow between components of the system are controlled. In various exemplary embodiments, data is received, sent or stored. In various exemplary embodiments, data and control commands are inputted into the system.

In various exemplary embodiments, a captured image is combined with one or more other scan jobs into a single combined job. In various exemplary embodiments, it is determined whether an image can be combined into an existing image or if several images can be combined. It is also determined whether one or more additional pages needs to be scanned as part of integrating a scan job. Further, it is determined whether any one of the images has one or more different scanning parameters. In various exemplary embodiments, the image is adjusted according to one or more different scanning parameters. In various exemplary embodiments, a properly adjusted image is combined with other scanned images into a single scanning job.

In various exemplary embodiments, a desired operation of obtaining, sending or integrating the scan jobs are selected. The selection can be a default operation or a selected operation. In various exemplary embodiments, a desired destination for the images is selected. The destination selected can be a default destination or a desired destination.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein:

FIG. 7 is a first exemplary embodiment of a meta job description according to this invention.

FIG. 8 is a second exemplary embodiment of a meta job description according to this invention.

DETAILED DESCRIPTION OF EXEMPLARY EMBODIMENTS

Figure 1:
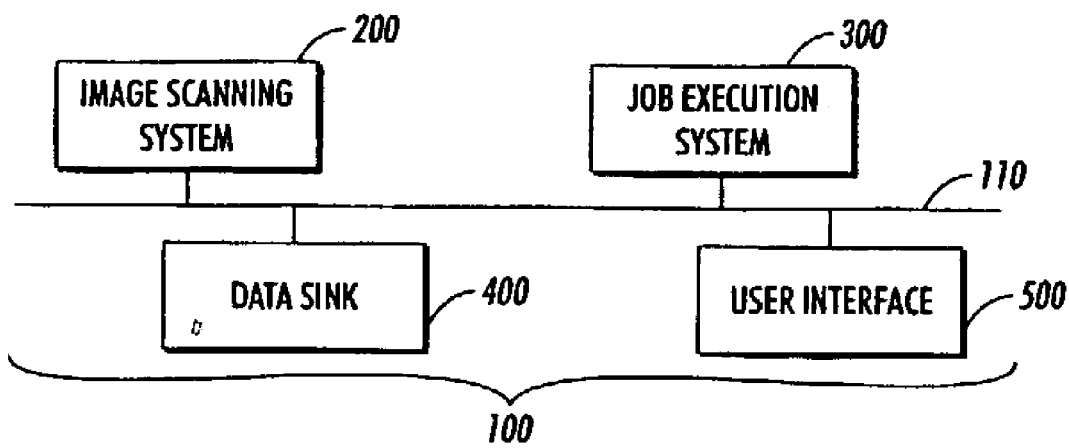
FIG. 1 is a block diagram of one exemplary embodiment of an image scanning system according to this invention.

FIG. 1 is a block diagram illustrating one exemplary embodiment of a scanning system 100 usable with the systems and methods according to this invention. As shown in FIG. 1, the scanning system 100 includes an image scanning system 200, a job execution system 300, a data sink 400 and a user interface 500, all communicating via one or more links 110.

The image scanning system 200 can be any source that can obtain, generate, or store an image, including a digital camera, a scanner, a digital copier, a file system, a Document Management/Content Management system, including those that are Web based, or any other known or later-developed device that is capable of capturing an image. It should also be appreciated that, while the image can be generated at the time of printing an image from an original physical document, the electronic image data could have been generated at any time in the past.

The job execution system 300 controls the general data flow between the other components of the system 100. In this exemplary embodiment, the job execution system 300 is implemented using a programmed general purpose computer. However, the job execution system 300 can also be implemented using a special purpose computer, a programmed microprocessor or microcontroller and peripheral integrated circuit elements, and ASIC or other integrated circuit, a digital signal processor, a hardware electronic or logical circuit, such as a discrete element circuit, a programmable logic device, such as PLD, PLA, FPGA or PAL, or the like. In general, any device capable of implementing a finite state machine that is in turn capable of implementing the flowcharts shown in FIGS. 4-6 can be used to implement the job execution system 300.

In various exemplary embodiment, the data sink 400 can be any known or later-developed device that is capable of receiving, sending and/or storing the image data generated using the systems and methods according to this invention, such as a display device, a printer, a copier or other image forming device, a facsimile device, a modem, a file system, a Document Management/Content Management system, including those that are Web based, a memory and the like.

The user interface 500 may be implemented using any combination of one or more user input devices, whether known or later-developed, that are capable of inputting data and/or control commands to the system 100 via the one or more links 110. The user interface 500 may be one or more of a keyboard, a mouse, a touch pen, a touch pad, a pointing device, or the like. The user interface can also be touch screen or an electronic display system, such as a CRT, LCD, LED, or the like used in conjunction with one or more of a keyboard, a mouse, a touch pen, a touch pad, a pointing device, or the like.

The one or more links 110 can be any known or later-developed devices or systems for connecting the image scanning system 200, the job execution system 300, the data sink 400 and the user interface 500, including a direct connection, a connection over a wide area network or a local area network, a connection over an intranet, a connection over the internet, a connection without wires such as infrared or a connection over any other distributed processing network or system. In general, the one or more links 110 can be any known or later-developed connection system or structure usable to connect the image scanning system 200, the job execution system 300, the data sink 400 and the user interface 500.

The image captured by the image scanning system 200 may be a scanned image of a physical document or a photograph, a captured frame of a video recording, or the like.

In the scanning system 100, by using the systems and methods according to this invention, an image captured by the image scanning system 200 according to one scan job can be combined with one or more other scan jobs into a single combined job. The job execution system 300 incorporates the scan parameters for a plurality of scan jobs, and takes each set of documents scanned by the image scanning system 200 according to one scan job, using a set of parameters specific to that scan job and thus that set of documents, and appends that set of documents scanned using that set of parameters to a file containing scanned documents that have been scanned using at least one different set of parameters. The scanned image data is sent over the link 110 to the job execution system 300, data sink 400 and/or user interface 500. The scanning system 100 can also create a single combined job larger than a capacity of the input device of a scanning device 240. The scanning system 100 can also direct a single combined job or components to a destination within the data sink 400. The user interface 500 can be used to input various job choices to the scanning system 100.

Figure 2:
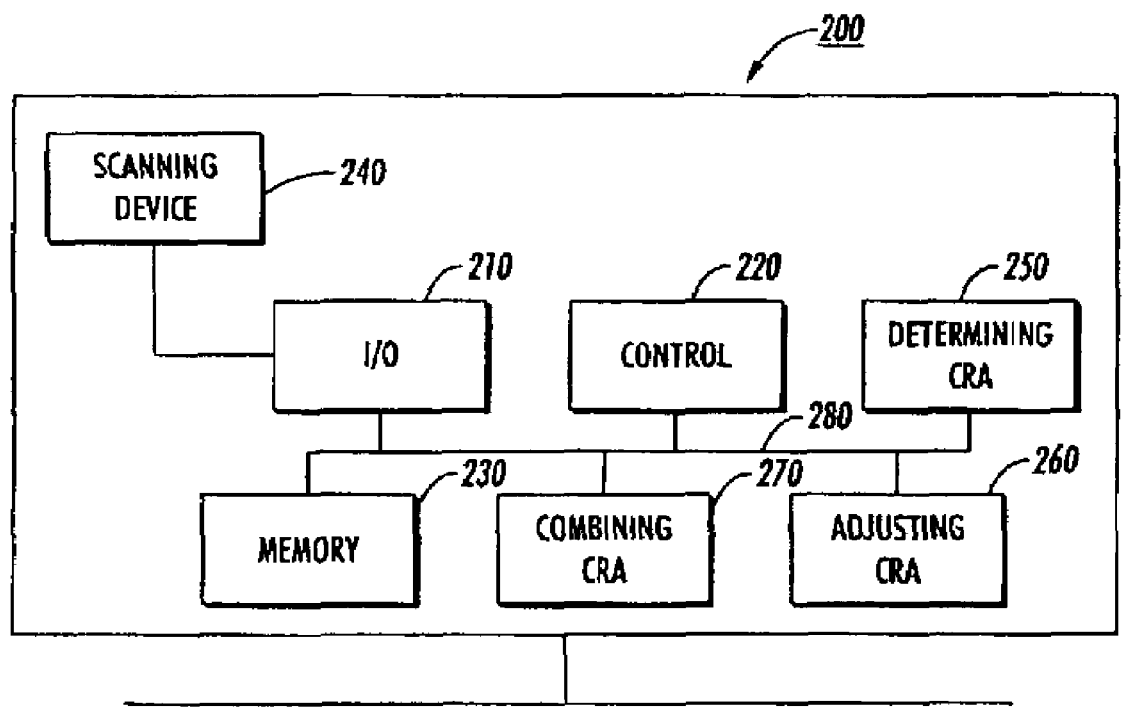
FIG. 2 is a block diagram showing in greater detail one exemplary embodiment of the image scanning system according to this invention.

FIG. 2 is a block diagram outlining in greater detail one exemplary embodiment of the image scanning system 200 shown in FIG. 1. As shown in FIG. 2, the image scanning system 200 includes an input/output interface 210, a controller 220, a memory 230, a scanning device 240, a determining circuit, routine or application 250, a combining circuit, routine or application 270, and an image adjusting circuit, routine or application 260, each interconnected by one or more data and/or control busses and/or one or more application programming interfaces 280.

The input/output interface 210 connects the image scanning system 200 to the outside environment. The controller 220 controls the input/output interface 210, the memory 230, the scanning device 240, the determining circuit, routine or application 250, the image adjusting circuit, routine or application 260, and/or the combining circuit, routine or application 270.

The memory 230 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or a re-writeable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The scanning device 240 obtains or captures an image. The scanning device 240 can be a digital camera, a scanner, or any other known or later-developed device that is capable of capturing electronic image data. The scanning device 240 can be integrated with one or more of the controller 220, the memory 230, the determining circuit, routine or application 250, the image adjusting circuit, routine or application 260, and/or the combining circuit, routine or application 270, as in a digital copier having an integrated scanner. Alternatively, the scanning device 240 can be connected to the input/output interface 210 of the image scanning system 200 using a connection, such as a direct connection, a connection over a wide area network or a local area network, a connection over an intranet, a connection over the internet, a wireless connection such as an infrared connection, or a connection over any other distributed processing network or system.

The determining circuit, routine or application 250 determines whether an image can be combined into an existing image or if several images can be combined. The determining circuit, routine or application 250 also determines whether one or more additional pages need to be scanned as part of integrating a scan job. If the determining circuit, routine or application 250 determines that any one of the images has one or more different scanning parameters, such as, for example, a different image resolution, a different page size, and/or a different format, the image adjusting circuit, routine or application 260 allows adjusting of the image to be combined into a single combine job.

The image adjusting circuit, routine or application 260 adjusts the image according to one or more different scanning parameters, such as, for example, an image resolution, a page size, and/or a format. When the image has been properly adjusted, the combining circuit, routine or application 270 combines the image with other previously scanned images into a single scanning job. The combined job can then be further processed by the controller 220, the determining circuit, routine or application 250, the image adjusting circuit, routine or application 260 and/or the combining circuit, routine or application 270, or can be output through the input/output interface 210 and sent over the one or more links 110, and/or held in the memory 230.

Figure 3:
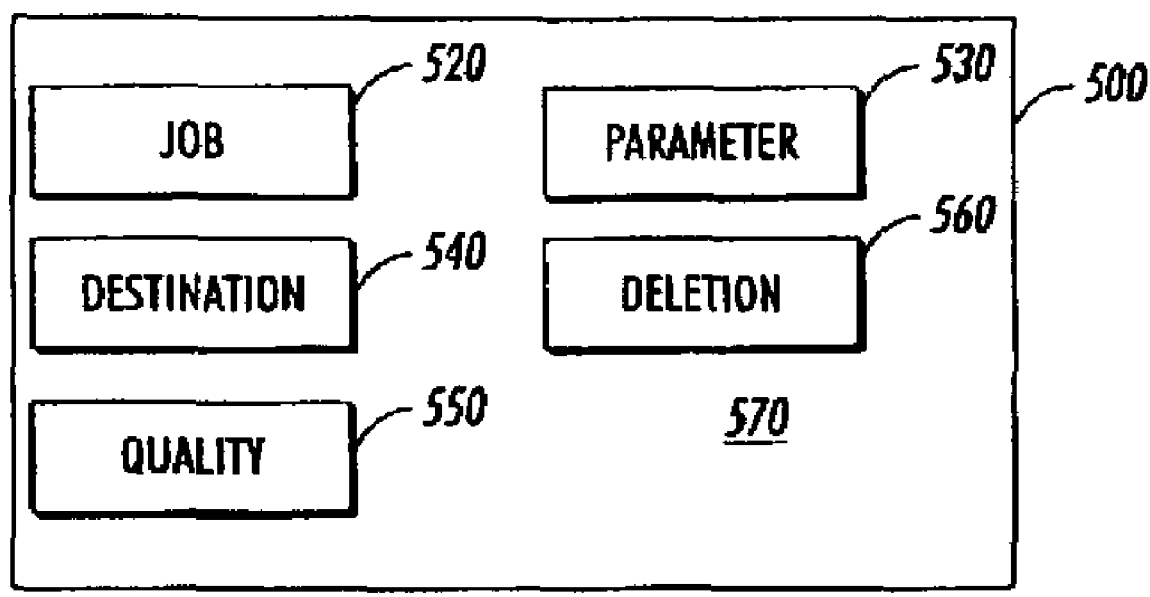
FIG. 3 illustrates one exemplary embodiment of user interface according to this invention.

FIG. 3 illustrates one exemplary embodiment of the user interface 500 of the scanning system 100 according to this invention. The user interface 500 may include elements such as a job selection widget 520, a parameter selection widget 530, a destination selection widget 540, a quality selection widget 550, and a deletion selection widget 560 within a display area 570. The job selection widget 520 is used to select a desired operation of obtaining, sending, or integrating of the scan jobs. The desired operation includes selecting from one or more default operations or creating a desired operation from available options in conjunction with the parameter selection widget 530, the destination selection widget 540, the quality selection widget 550, the deletion selection widget 560 and/or the like.

The parameter selection widget 530 is used to select a desired combined job parameter. The selected desired operation includes selecting the type, size, resolution, color, and/or the like, and selecting from one or more default values and/or creating a desired operation from available options. The destination selection widget 540 is used to select a desired destination for the one or more images and/or for a final combined job. The selected destination can include a default destination, can be the memory 230, or can be any other desired destination. The quality selection widget 550 is used to select a desired quality of the image and the deletion selection widget 560 is used to delete a selection. Although described as separate elements, the user interface 500 may be a template, a flowchart, a touch screen and/or any other form of graphic user interface that presents optional choices.

Figure 4:
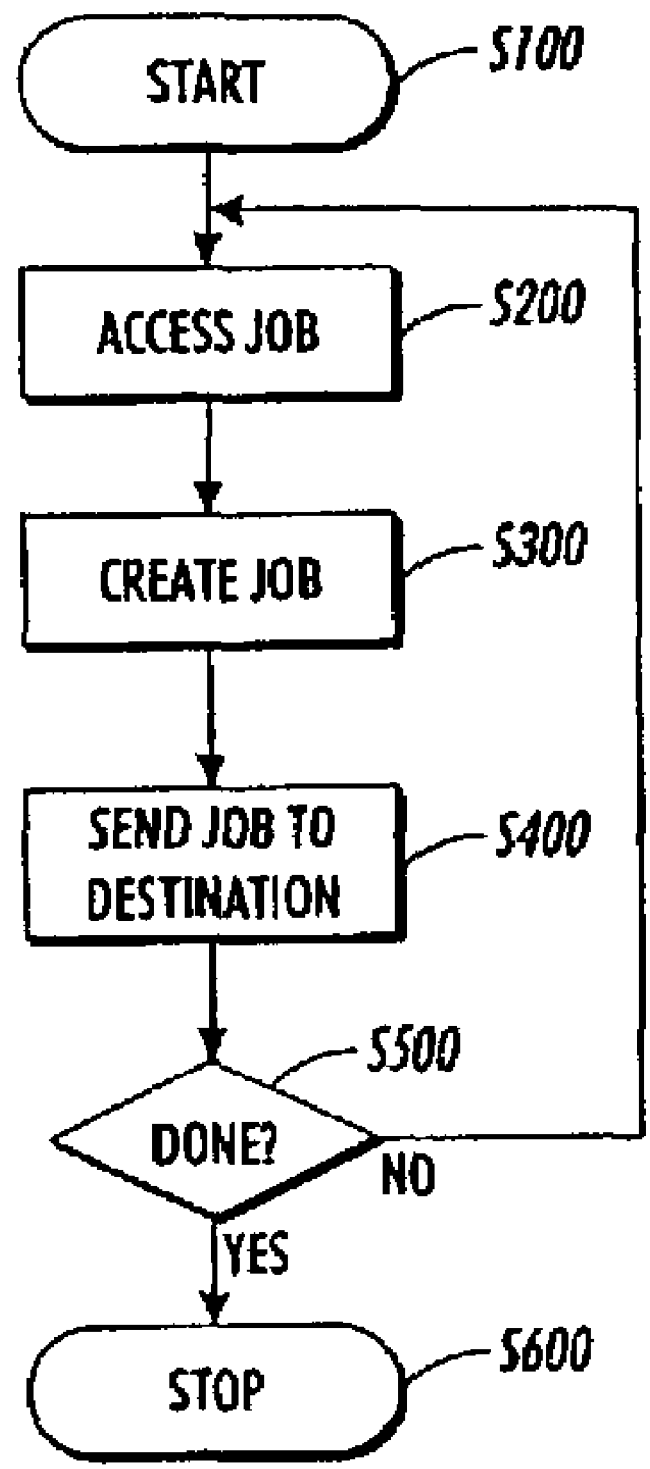
FIG. 4 is a flowchart outlining one exemplary embodiment of a method for building a multi-scan job file according to this invention.

FIG. 4 is a flowchart outlining one exemplary embodiment of a method for building a multi-scan job file according to this invention. Beginning in step S100, operation continues to step S200, where a job is accessed by opening and readying a job for user input, user modification, and just simple user verification, i.e. user does not change any of the parameters. Then, in step S300, first or next a scan job is created. Next, in step S400, the created scan job is sent to a destination, which may include a storage location or a remote location. Operation then continues to step S500, where a determination is made whether any more operations are desired. If so, operation returns to step S200. Otherwise, operation continues to step S600, where the operation of the method ends.

Figure 5:
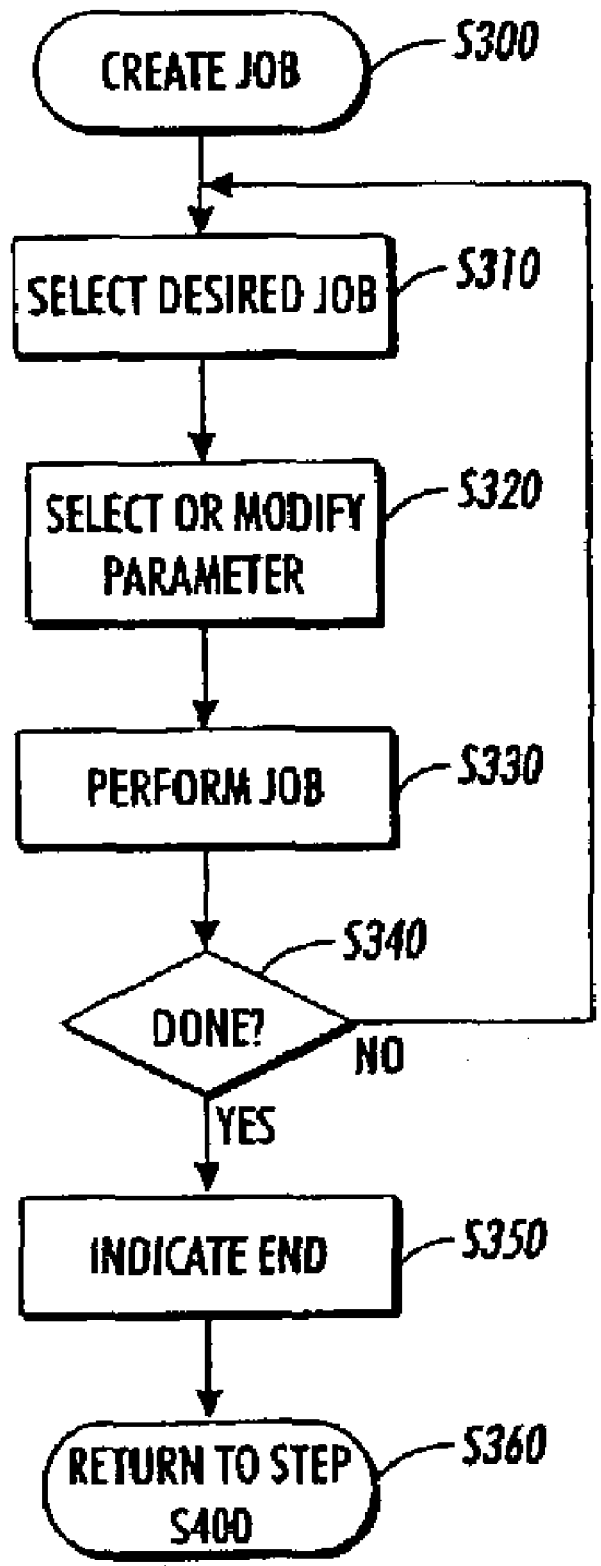
FIG. 5 is a flowchart outlining in greater detail one exemplary embodiment of the method for scanning a job according to this invention.

FIG. 5 is a flowchart outlining in greater detail one exemplary embodiment of the method of creating a job of step S300 according to this invention. Beginning in step S300, operation continues to step 5310, where a desired job is selected based on the selection made in step S200. Next, in step S320, the parameters for a combined job are selected based on the desired selection made in step S200. Then, in step S330, the desired job is created. The operation then continues to step S340.

In step S340, a determination is made whether the job is complete based on the selection made in step S200. If the current job is not completed, operation returns to step S310. Otherwise, an indication that the current job is completed is generated in step S350. Operation then continues to step S360, where operation of the method returns to step S400.

Figure 6:
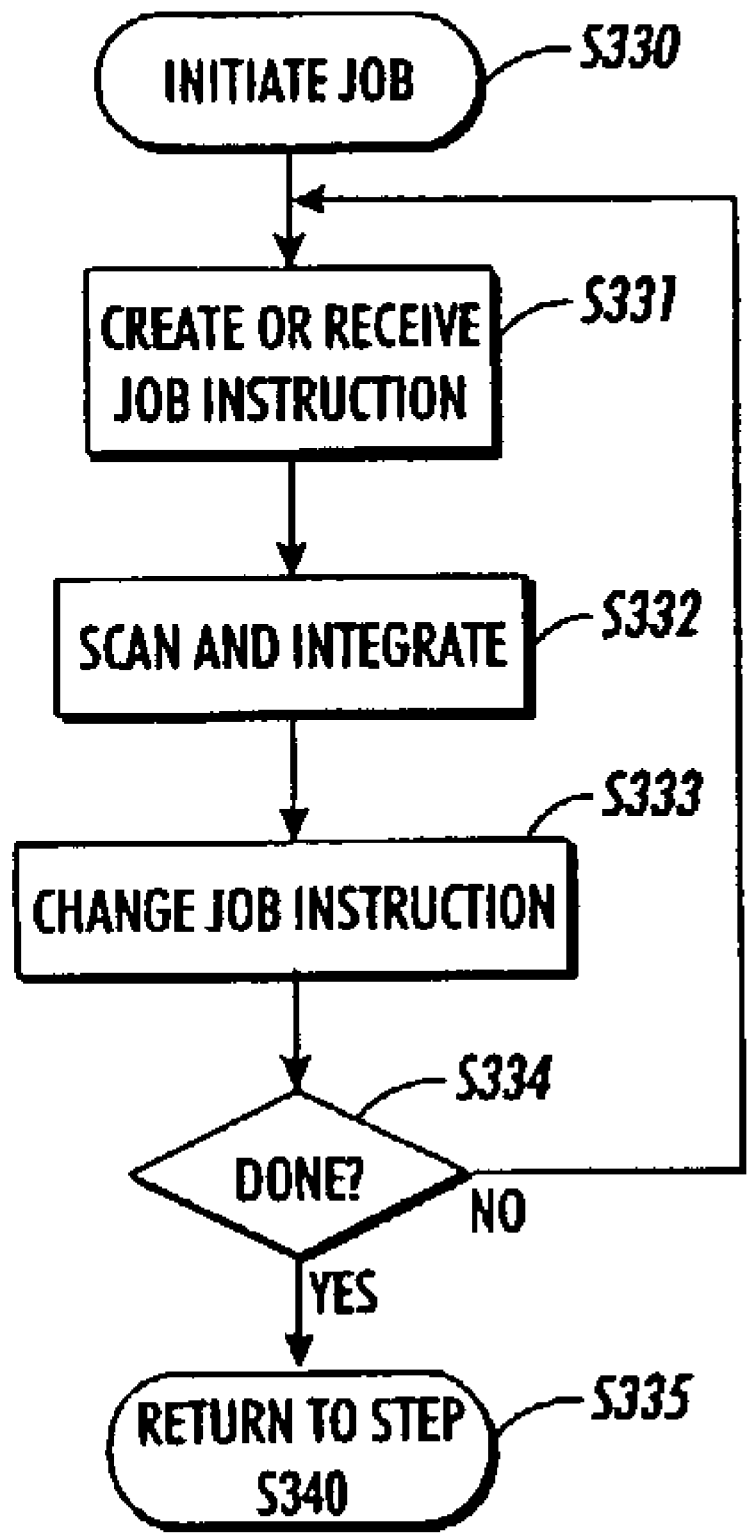
FIG. 6 is a flowchart outlining in greater detail one exemplary embodiment of the method for executing a meta job description.

FIG. 6 is a flowchart outlining in greater detail one exemplary embodiment of the method for performing the job of step S330 according to this invention. Beginning in step S330, operation continues to step S331, where a meta job description is created or received that contains the selection made in step S320. Then in step S332, scanning and integrating the jobs according to the meta job description is performed. Then, in step S333, information about the scanning and combining job having been performed and any changes occurring because of the scanning and combining job performance are recorded on the meta job description and the original meta job description is appended to the combined job. Then, in step S334, a determination is made whether the job is completed based on the selection made in step S320. If not, operation returns to step S331. Otherwise, operation continues to step S335, where operation of the method continues to step S340.

FIG. 7 illustrates a first exemplary embodiment of a meta job description according to this invention. As shown in FIG. 7, the exemplary meta job description may be a default operation for scanning a single document into a single scanned job titled "my_doc".

FIG. 8 illustrates a second exemplary embodiment of a meta job description. In particular, the meta job description shown in FIG. 8 is obtained as a resulting meta job description after incorporating a change according to this invention. As shown in FIG. 8, the exemplary meta job description scans a first document titled "partial_doc1" then scans a second document titled "partial_doc2" then combines these first and second documents to create a single scanned job titled "my_doc". As shown in FIG. 8, the documents "partial_doc1" and "partial_doc2" have different scanning parameters, namely, different resolutions. Consequently, the meta job description functions both as instructions for scanning these two jobs, for combining these two jobs into a single combined job, and as a record of the resulting combined job.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for building a multi-scan job file, comprising:
   accessing a job for user input;
   selecting one or more output parameters for the job;
   receiving a meta job description for scanning at least a first image, the meta job description specifying a first value for at least one parameter of the first image;
   scanning the first image according to the meta job description and the output parameters;
   combining the scanned image and at least one other image according to the meta job description by appending the scanned image with the at least one other image, wherein the first value of the at least one parameter of the first image differs from a second value of the at least one parameter of the at least one other image;
   appending the meta job description to the job; and
   sending the job to a destination, wherein the job contains a plurality of sub-jobs, including at least one of the sub-jobs designated for processing the scanned image and other ones of the sub-jobs designated for processing the at least one other image.

2. The method of claim 1, wherein accessing the job comprises:
   opening the job; and
   readying the job.

3. The method of claim 1, wherein the destination includes a storage location.

4. The method of claim 1, wherein the destination includes a remote location.

5. The method of claim 1, wherein the at least one parameter includes a type, size, resolution, format, or color.

6. A scanning system usable to combine a number of scan jobs into a single combined job, comprising an image scanning system for scanning at least one image, further comprising:
- a job selector usable to select a desired operation to be performed on a scanned image;
- a parameter selector usable to select a desired combined job parameter;
- a determining module that identifies at least one image having one or more scanning parameters;
- a scanning device usable to obtain a scanned image from the one image, based on a meta job description that specifies a first value for the scanning parameters of the one image;
- an image adjusting module that adjusts the scanned image based on the scanning parameters and the desired combined job parameter;
- a combining module that creates a combined job from the scanned image and at least one other image based on the meta job description by appending the scanned image with the at least one other image, wherein the combined job contains a plurality of sub-jobs, at least one of the sub-jobs being designated for processing the scanned image and other ones of the sub-jobs being designated for processing the at least one other image, and wherein the combining module appends the meta job description to the combined job.

7. The scanning system of claim 6, wherein the desired combined job parameter includes type, size, resolution, format, or color.

8. The scanning system of claim 6, wherein the desired operation to be performed on the scanned image includes deleting

* * * * *